(12) United States Patent
Sonenthal

(10) Patent No.: US 10,941,857 B2
(45) Date of Patent: Mar. 9, 2021

(54) SELF-SHIFTING BICYCLE THAT SHIFTS AS A FUNCTION OF POWER OUTPUT

(71) Applicant: Avraham Sonenthal, Baltimore, MD (US)

(72) Inventor: Avraham Sonenthal, Baltimore, MD (US)

(*) Notice: Subject to any disclaimer, the term of this patent is extended or adjusted under 35 U.S.C. 154(b) by 114 days.

(21) Appl. No.: 16/210,666

(22) Filed: Dec. 5, 2018

(65) Prior Publication Data

US 2019/0301598 A1  Oct. 3, 2019

Related U.S. Application Data

(60) Provisional application No. 62/649,292, filed on Mar. 28, 2018.

(51) Int. Cl.
*B62M 25/00* (2006.01)
*B62M 25/08* (2006.01)
*B62M 11/04* (2006.01)
*B62M 9/04* (2006.01)
*B62M 9/06* (2006.01)
*F16H 61/02* (2006.01)
*B62M 9/10* (2006.01)
*F16H 61/66* (2006.01)

(52) U.S. Cl.
CPC ........... *F16H 61/0213* (2013.01); *B62M 9/10* (2013.01); *B62M 11/04* (2013.01); *B62M 25/08* (2013.01); *F16H 61/66* (2013.01); *F16H 2061/022* (2013.01)

(58) Field of Classification Search
CPC ...... B62M 25/00; B62M 25/08; B62M 11/04; B62M 9/04; B62M 9/06
See application file for complete search history.

(56) References Cited

U.S. PATENT DOCUMENTS

| 672,962 A | 4/1901 | Seymour | |
|---|---|---|---|
| 4,373,926 A | 2/1983 | Fullerton | |
| 5,599,244 A * | 2/1997 | Ethington | B62M 9/122 |
| | | | 280/261 |
| 6,015,159 A * | 1/2000 | Matsuo | B62M 25/00 |
| | | | 280/236 |
| 6,354,980 B1 | 3/2002 | Grant | |
| 7,547,021 B2 | 6/2009 | Bon | |

(Continued)

FOREIGN PATENT DOCUMENTS

DE  102013201101 A1 *  7/2014  ............. B62M 6/45

OTHER PUBLICATIONS

Harmony / Harmony H|Sync—Fallsbrook Technologies—https://www.fallbrooktech.com/cycling/harmony—Last visited Mar. 3, 2019.

*Primary Examiner* — Tisha D Lewis
(74) *Attorney, Agent, or Firm* — Royal W. Craig; Gordon Feinblatt LLC

(57) ABSTRACT

A self-shifting bicycle that shifts intelligently as a function of power output. The bicycle uses a computer control system mounted to the handlebar, a power meter attached to the front gearwheel, and an actuator module for adjusting the transmission. The computer control system software changes output gear ratio in accordance with load encountered as the cyclist rides. This allows the rider to set a preferred power output and to maintain that preferred power output very closely.

26 Claims, 7 Drawing Sheets

(56) References Cited

U.S. PATENT DOCUMENTS

| | | | |
|---|---|---|---|
| 8,512,182 B2 * | 8/2013 | Tam | B62M 11/04 474/80 |
| 8,900,087 B2 | 12/2014 | Wad | |
| 2016/0031527 A1 * | 2/2016 | Bortolozzo | B62M 9/123 701/58 |
| 2016/0041051 A1 * | 2/2016 | Smit | G01L 23/24 700/91 |
| 2016/0325802 A1 * | 11/2016 | Leiber | C22B 25/06 |
| 2018/0099718 A1 * | 4/2018 | Bleecker | G01S 19/19 |
| 2018/0111661 A1 * | 4/2018 | Wesling | F16H 61/0213 |
| 2018/0134341 A1 * | 5/2018 | Payne | F16H 3/46 |

* cited by examiner

SELF-SHIFTING BICYCLE THAT SHIFTS AS A FUNCTION OF POWER OUTPUT

CROSS-REFERENCE TO RELATED APPLICATION(S)

The present application derives priority from U.S. provisional application 62/649,292 filed 28 Mar. 2018.

BACKGROUND OF THE INVENTION

Field of the Invention

The present invention relates to bicycle transmissions and gearing systems, controls therefor and, more particularly, to a method of shifting for bicycles that shifts as a function of power output, taking the place of manual shifting, and electronic control system therefor that maintains a constant work output as the cyclist rides.

Description of the Background

Bicycles are well-known human powered vehicles consisting of two wheels, usually supporting pneumatic (air filled) tires, installed into a frame. The frame includes a seat for the rider, handlebars to steer and a crank to allow the legs to transmit power to the rear wheel. The crank is usually connected to the rear wheel sprocket through a chain. The size of the crank chain wheel relative to the rear sprocket creates what is known as a gear ratio. For example, if the crank wheel and the sprocket wheel are of the same circumference, then turning the front crank one revolution will turn the rear wheel one revolution. If on the other hand the crank wheel is twice the circumference of the sprocket wheel, turning the front toothed wheel one revolution will turn the rear wheel two revolutions. The more times the rear wheel turns with each crank revolution, the higher the gear ratio. To understand how this matters, consider the following definitions: F=ma, where F=force (newtons), m=mass (grams) and a=acceleration (m/s2).

Force applied over a distance produces work, which we define as follows:

$$W=Fd$$

where W=work (joules), F=Force (newtons), and d=distance (meters), Power (P) is the amount of work per second, and the unit of power is watts.

Intuitively one can see that peddling a bicycle downhill one meter takes less work than moving the bicycle forward on a level surface. Peddling the bicycle uphill takes even more work. What is not intuitive is that the sum total is not merely a sum of the parts. Fluctuating work output is more tiring than a constant work output to the human rider on both a physical and psychological level, and constant variation across hilly terrain turns out to be exhausting.

In the early 20th century bicycle manufacturers started developing bicycles with multiple gear ratios. They understood the need for the rider to have a more even work output. At first a three-speed transmission came on the market. Later in the 1960s derailleur five speed systems became available. These gave way to 10 speed systems. Today 27 speed systems are available. The trend toward ever more gear ratios has continued with the introduction of continuously variable transmissions or CVTs. CVTs generally date to the early 20th century, such as the belt-drive Reeves variable speed transmission as disclosed in U.S. Pat. No. 672,962.

CVTs for chain driven bicycles are also known, as shown in U.S. Pat. No. 4,373,926. Nuvinci, Inc. has also introduced a commercial continuously variable transmission (CVT). This reflects the awareness that the more constant the work output required of the rider the more efficiently the rider can pedal. Still these existing systems require the rider to manually change the gears. The requirement for manual gear changing is inefficient, because with 27 gears most riders have to guess what combination of forward and rear chain ring to use at any moment. Most riders just guess and have to hunt around for a combination that works. Even with CVT type transmissions, shifting is inefficient. Shifting detracts from concentration, attention to traffic, cadence, and other important aspects of bicycling. It is a waste of energy. Moreover, many riders do not efficiently choose the best gears for current riding conditions.

What is needed is an automatic shifting and electronic control system therefore that eliminates manual shifting, and instead uses a computer to measure the actual power output produced by the rider, and to shift intelligently as a function of power output so as to allow the rider to set a preferred power output and to maintain that preferred power output as closely as possible.

SUMMARY OF THE INVENTION

Accordingly, it is an object of the invention to provide a bicycle that shifts intelligently as a function of power output so as to allow the rider to set a preferred power output and to maintain that preferred power output as closely as possible.

It is another object to provide a bicycle that shifts instantly and accurately as a function of power output.

It is another object to provide an electronic control system for a bicycle that automatically varies gear ratio to maintain a constant power output from the rider despite changes in slope.

Another object of this invention is to improve upon the devices of the prior art by providing an assembly that is light in weight, solid in construction, and capable of high transmission efficiency, while still being reliable, simple to manufacture, and easy to maintain with only minimal maintenance requirements.

In accordance with the foregoing objects, the present invention is a self-shifting bicycle that shifts intelligently as a function of power output. The bicycle uses a graphical control system that changes output gear ratio in accordance with load encountered as the cyclist rides. This allows the rider to set a preferred power output and to maintain that preferred power output very closely.

DESCRIPTION OF THE DRAWINGS

Other objects, features, and advantages of the present invention will become more apparent from the following detailed description of the preferred embodiment and certain modifications thereof, in which.

DETAILED DESCRIPTION

The present invention comprises of a self-shifting bicycle 2 that shifts intelligently as a function of power output. The bicycle 2 uses a graphical control system that changes output gear ratio in accordance with load encountered as the cyclist rides. This allows the rider to set a preferred power output and to maintain that preferred power output as closely as possible. In a preferred embodiment the bicycle uses a step less self-shifting CVT that takes the place of a manually shifted system.

Figure 1:
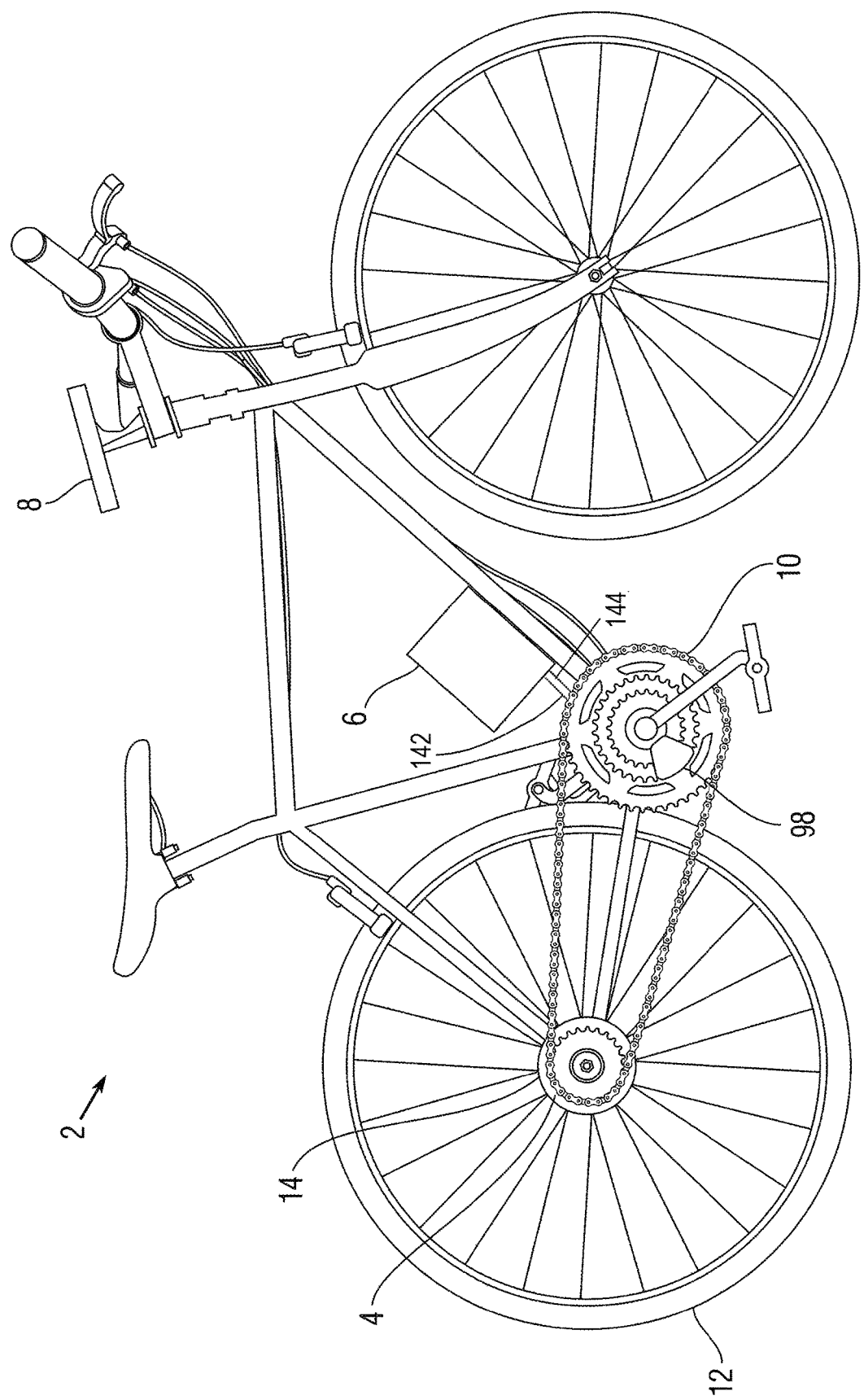
FIG. 1 is a perspective view of the self-shifting bicycle 2 that automatically varies gear ratio to maintain a constant power output from the rider despite changes in slope, wind resistance, etc.

FIG. 1 is a perspective view of a preferred embodiment of the bicycle 2 that uses a step less self-shifting automatic transmission rather than a manually shifted system. Bicycle 2 generally includes, in combination, a continuously-variable transmission (CVT) 4, main actuator module 6, and computer control system 8, which collectively automatically varies gear ratio to maintain a constant power output from the rider despite changes in slope.

Figure 2:
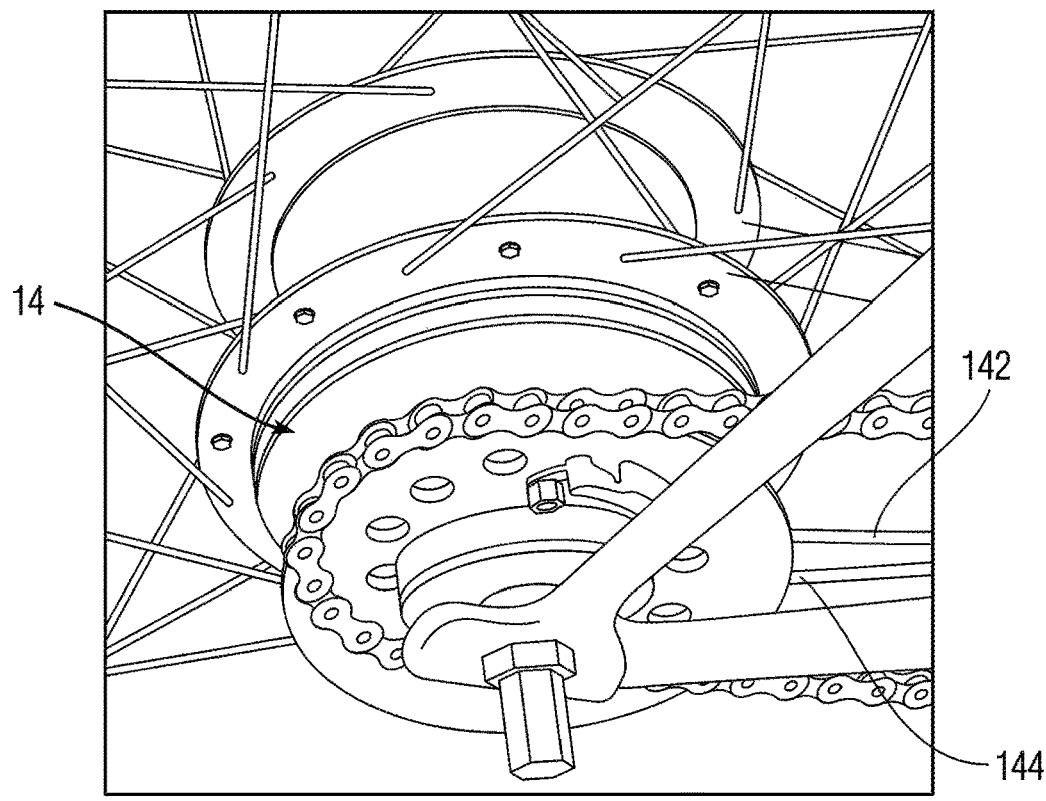
FIG. 2 is a close-up view of the continuously-variable transmission (CVT) 14.

FIG. 2 is a close-up view of the CVT 14, which may be a NuVinci® CVT, a commercially-available compact, high torque-density unit that uses a planetary configuration based on spheres and traction to provide continuously variable speed ratio control. The CVT 14 operates two shift cables 142, 144 that run to the shifting mechanism at the rear hub. As one cable 142 is pulled the other 144 is expended and this rotates the hub-interface one way, and vice versa. The CVT 14 transmission continuously varies the ratio of the number of turns of the pedal crank 10 with respect to the rotation of the rear wheel 12. One skilled in the art should understand that the present invention has applicability to other bicycle shifting systems, such as bicycle electrically-actuated derailleur systems, Shimano's Dura-Ace Di2™ electronic shifters as an example. In addition, the present invention has applicability to other bicycle internal discrete gear hub systems beside continuously variable transmissions (CVTs). For example, the Rohloff™ E-14 SPEEDHUB 500 can interface with the present system, the latter taking over shifting decisions. In the illustrated embodiment pedal crankset 10 is directly coupled to the CVT transmission 14 by a conventional chain. The CVT 14, actuator module 6 and computer control system 8 allow the drivetrain to operate at constant torque, such that overall efficiency can be improved as described above. The CVT 14 is connected by shift cables 142, 144 to the main actuator module 6. The main actuator module 6 communicates with the computer control system 8 via a series of control cables. However, one skilled in the art will understand that a radio communication protocol such as Bluetooth LE (BLE) could be implemented between module 8 and 6 as a matter of design choice. In either case main actuator module 6 provides smooth, seamless shifting of the CVT 14 transmission speed ratio across a full range of gear ratios. Since there are no fixed gear ratios, the computer control system 8 is able to pinpoint and transmit a control signal setting the optimal gear ratio to the main actuator module 6 to maintain a constant torque (based on sensor feedback), thereby allowing the rider to operate substantially at their optimal work output level for a given operating condition.

The computer control system 8 combines generic hardware and non-generic software, and can include any small commercially-available tablet computer or personal digital assistant with a mobile operating system and 3-7"-diagonal LCD touchscreen display, a rechargeable battery, and a wired or wireless communication ability in a small IPX-9-rated thin, flat package. One skilled in the art should understand that the user (as opposed to the manufacturer) may provide their own computer control system 8 by simply downloading the manufacturer's software application (as will be described) onto their personal smartphone, and mounting the smartphone on the handlebars.

Figure 3:
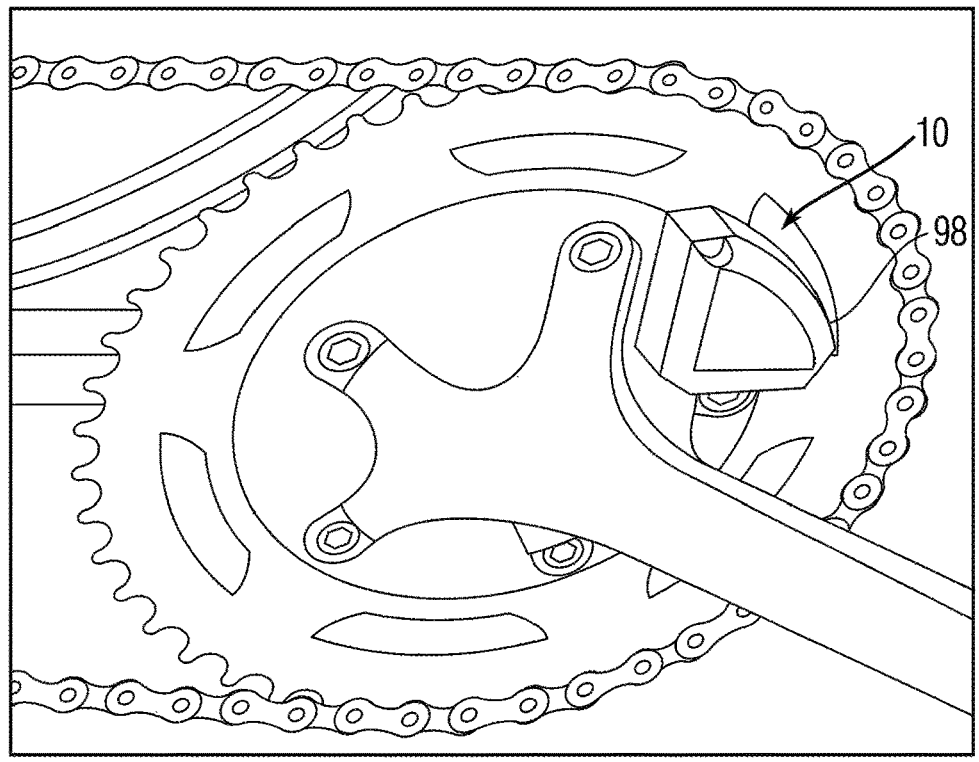
FIG. 3 is a close-up view of the power meter 98.

FIG. 3 is a close-up view of the power meter 98, which in the preferred embodiment is a BLUETOOTH®-equipped power meter that functions by measuring the torque applied to a specially designed crankset 10 to which it is attached, multiplied by the speed at which it is rotating. A Powertap® C1 chainring power meter is a good choice as it includes dual BLUETOOTH® and ANT+connectivity and weighs only about 150 grams with on-board CR2032 battery. The C1 chainring includes the entire crankset though it mounts to the existing hardware on the bike. One skilled in the art should understand that a variety of suitable power meters may exist for measuring power or even estimating power applied by the rider based on factors such as speed, incline, etc. Other power meters may be wireless or wired, and in all such cases are considered to be within the scope and spirit of the present invention.

Figure 4:
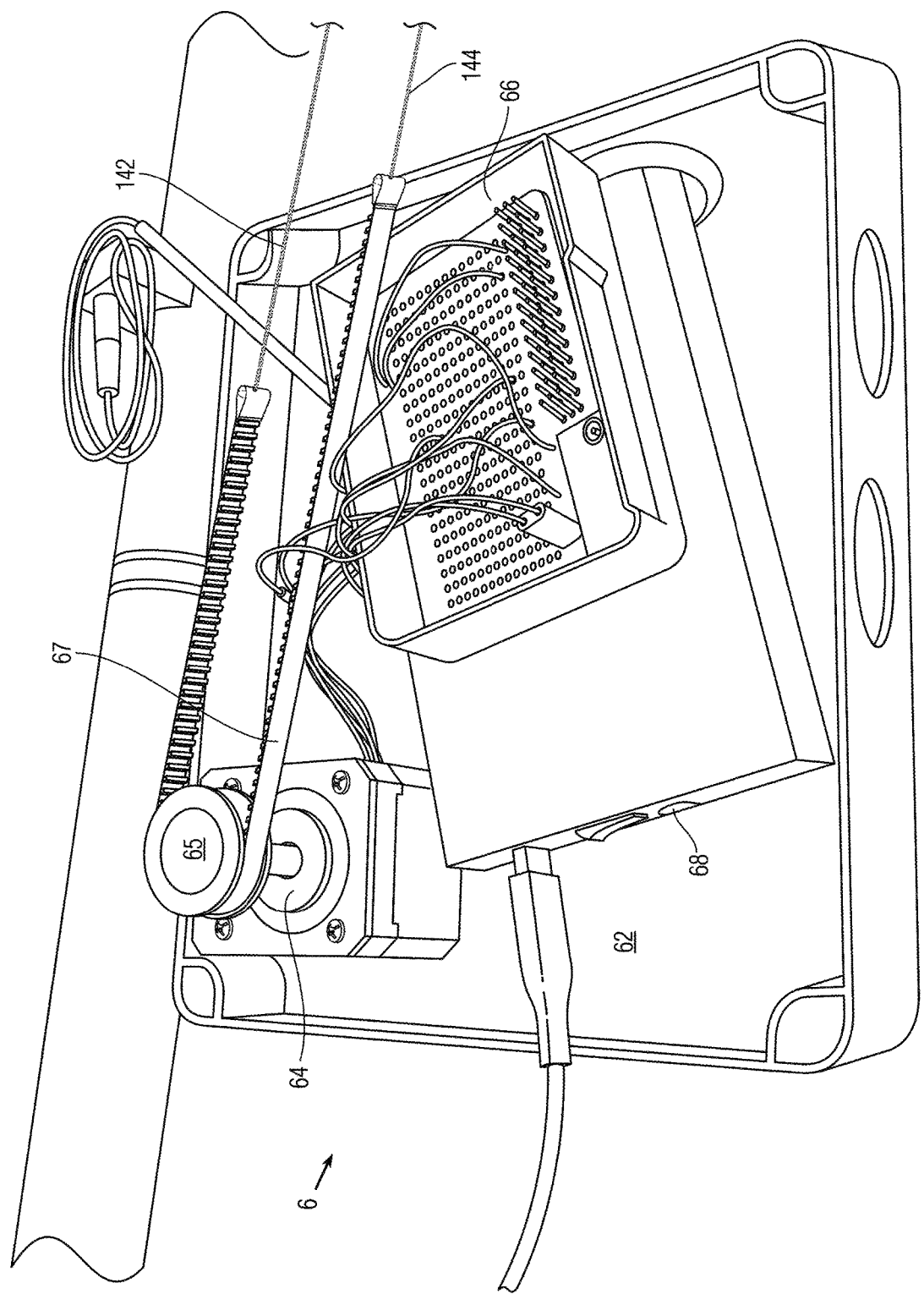
FIG. 4 is a perspective view of the main actuator module 6.

FIG. 4 is a perspective view of the main actuator module 6. Main actuator module 6 generally comprises a rugged ABS plastic enclosure 62 mounted within the main triangle of the bicycle frame by two-point attachment to the down tube and seat tube. The enclosure 62 contains a stepper motor 64 for indexed rotation, and a suitable stepper motor controller 66. The enclosure 62 also contains a 12V power source 68, plus a communication port or BLUETOOTH® transceiver for communication to the computer control system 8. The stepper motor 64 is preferably a low-weight, low-profile step or stepper motor with good holding torque such as, for example, a Sanyo® Pancake Stepper Motor (bipolar, 200 Steps/Rev, 50×11 mm, 4.5V, 1 A/Phase power and control). An exemplary stepper motor controller 66 is the Texas Instruments® DRV8825 which is a micro-stepping bipolar stepper motor driver. The DRV8825 operates on 3.3V DC power from an 8.2V to 45V operating supply voltage range, and so power source 68 is preferably a rechargeable lithium-ion battery sized to fit within enclosure 62. A suitable power source 68 is an 11,000 mah LiPo® 3250 3S 11.1v Battery Pack.

The rotor of stepper motor 64 is connected though a mechanical linkage to shift cables 142, 144 which are in turn connected to the CVT 14 shift controller. The stepper motor 64 is mounted within enclosure 62 such that its rotor is parallel to the axis of rotation of the CVT hub 14. A toothed pulley 65 is mounted on the rotor of the stepper motor 64. A discrete length of toothed belt 67 is mounted on the stepper 64 rotor axle and is wrapped around the pulley 65. Each end of the toothed belt 67 is affixed to a corresponding end of one of the shift cables 142, 144. This way, clockwise indexed rotation of the stepper motor 64 rotor axle will increase the gear ratio of the CVT 14 by a calibrated amount and counter-clockwise indexed rotation of the stepper 64 rotor axle will decrease the gear ratio of the CVT 14 accordingly.

Figure 5:
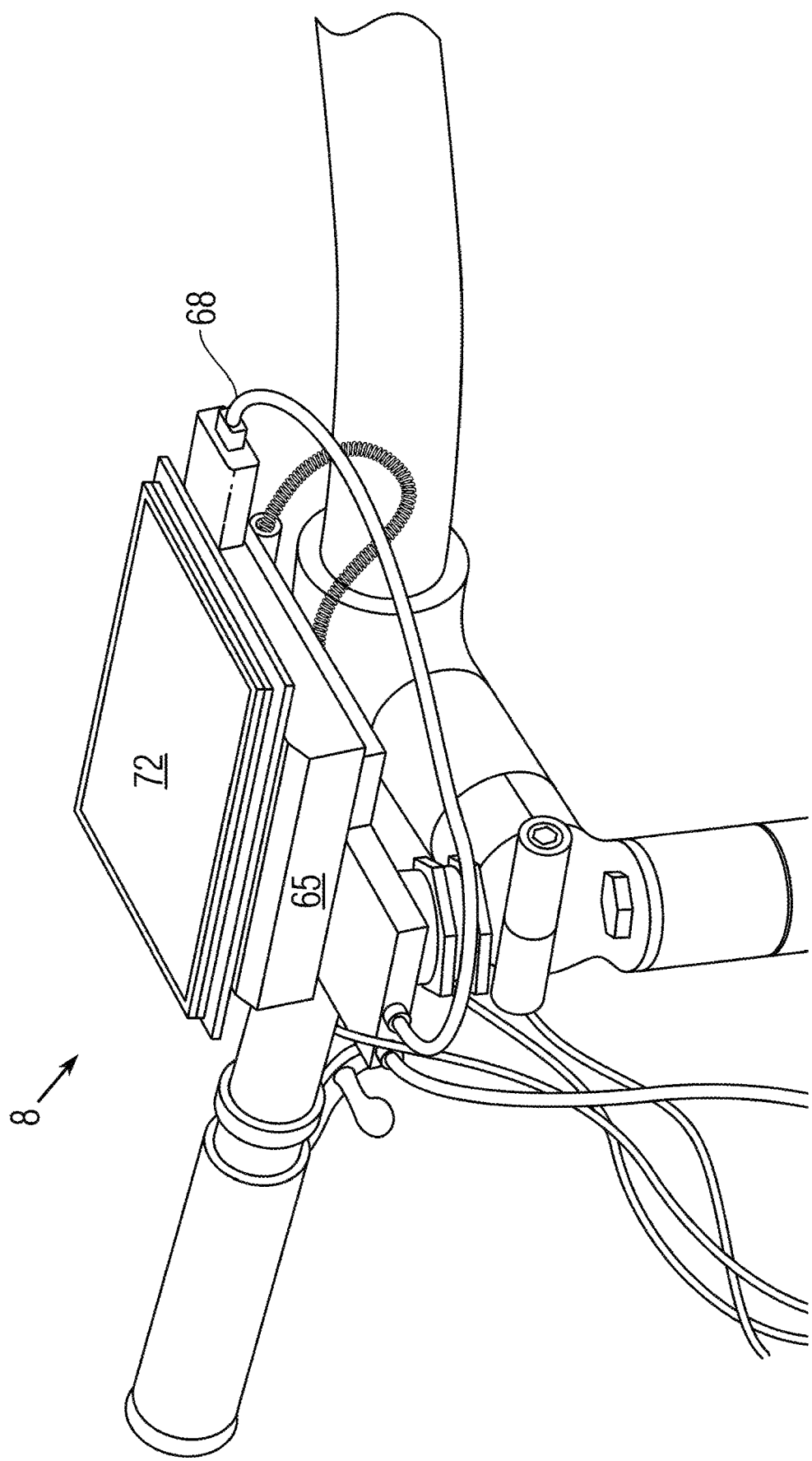
FIG. 5 is a perspective view of an exemplary computer control system 8.

FIG. 5 is a perspective view of an exemplary computer control system 8. The computer control system 8 includes a computer 65 and touchscreen display 72 that sits centrally on the handlebars at the stem in a piggyback manner. Computer 65 may be any low-power computer processor platform with wired output 68 (or alternate integral BLUETOOTH® transceiver), and capable of controlling stepper driver circuit 64 accordingly. A suitable exemplary computer 65 is the Raspberry Pi® 3 Model B single-board computer with wireless LAN and BLUETOOTH® connectivity, and a suitable display 72 is any generic 5" TFT touchscreen LCD display screen.

Figure 6:
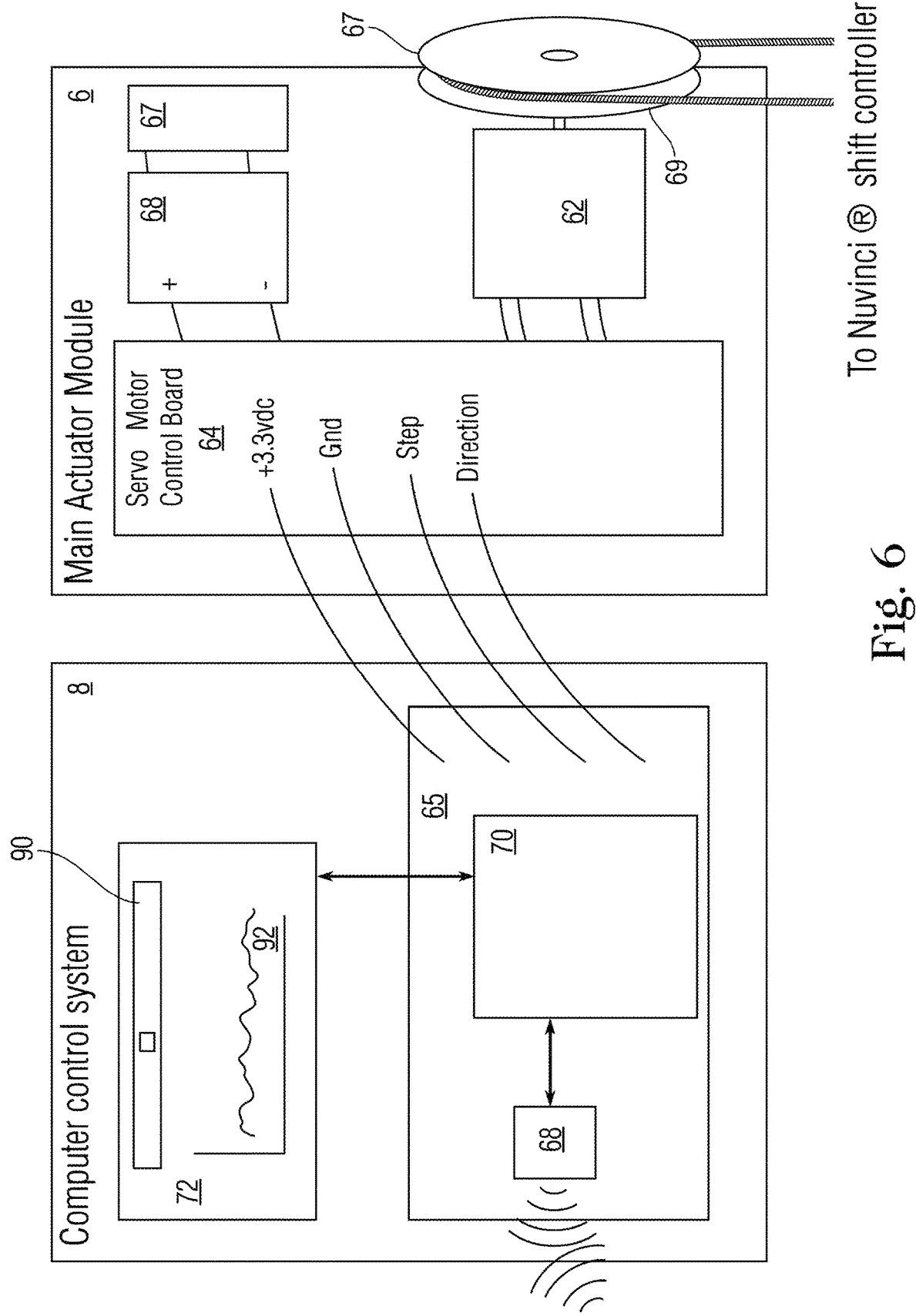
FIG. 6 is a block diagram of the main actuator module 6 and computer control system 8.

FIG. 6 is a block diagram of the main actuator module 6 and computer control system 8. In the illustrated embodiment the computer control system 8 is connected to the main actuator module 6 by a series of four control cables (3.3v, ground, step, and direction). However, in an alternate embodiment the computer control system 8 could be self-powered by its own battery and the step and direction controls may be wireless (e.g., BLUETOOTH®). The power source 68 may optionally be connected to a charging circuit 67 such as a Micro USB 1A 18650 lithium battery charger board module TP4056 TE585. Charging circuit 67 may get its charge from an outlet between rides or any accessory electromechanical or solar charger. Main actuator module 6 is fixedly mounted on the diagonal stay of bike 2.

The computer 65 runs software 70 for monitoring power meter 98 and presenting a graphical user interface (GUI) on touchscreen display 72, and maintaining a constant torque based on power meter 98 feedback and parameters entered by the rider into the computer 65.

Figure 7:
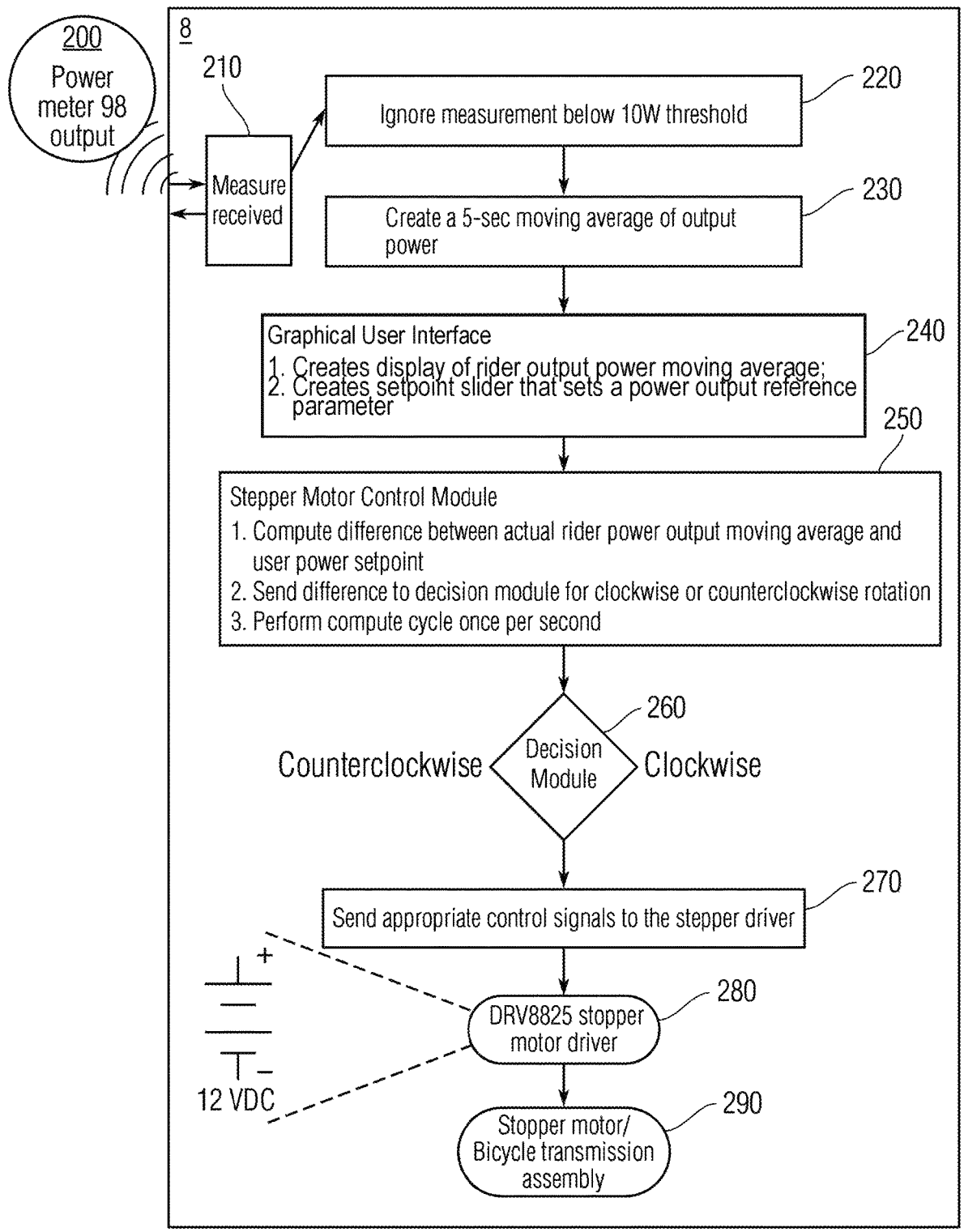
FIG. 7 is a flow diagram of the computer control system 8 software 70.

FIG. 7 is a flow diagram of the computer control system 8 software 70. At step 200 the power meter 98 provides incremental measurements of the power (watts) the rider is generating in both legs and transmits the measurement by BLUETOOTH® to computer control system 8. At step 210 the signal is received at computer control system 8 and decoded. At step 220 the decoded power data is temporarily stored in a first-in-first out manner and the stored subset of data is analyzed.

At step 230 the computer 65 maintains a running (e.g., 5-second) average of work output of the rider. At step 240, and as generally seen in FIG. 3 the computer control system 8 software 70 creates a GUI display for touchscreen 72 (FIG. 2).

Figure 8:
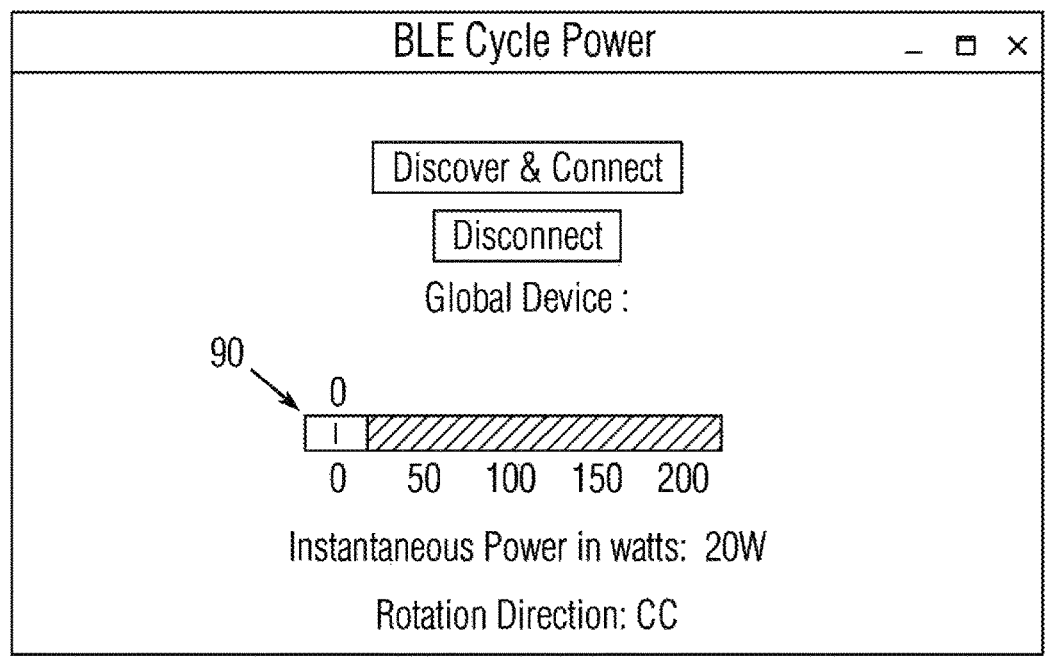
FIG. 8 is an enlarged screen print of the computer control system 8 GUI display for touchscreen 72.
Figure 8:
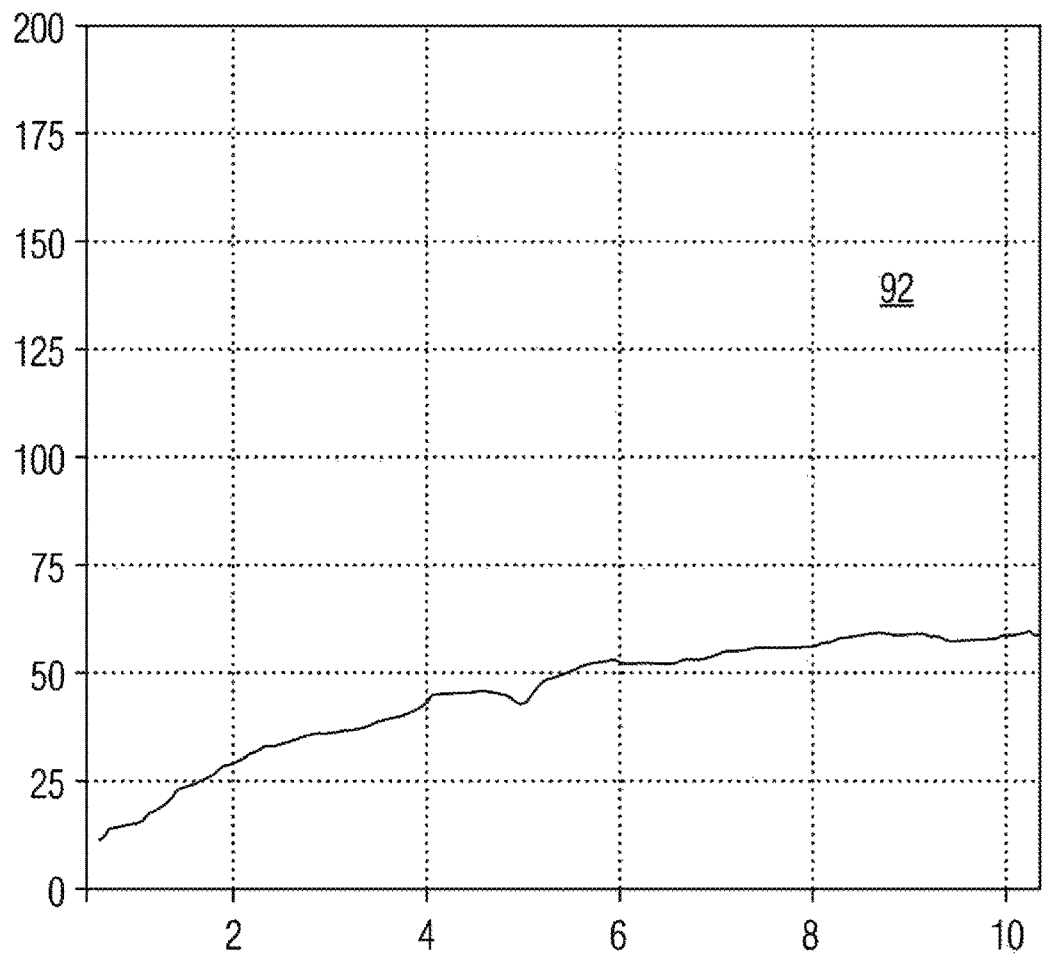

FIG. 8 is an enlarged screen print of the computer control system 8 GUI display for touchscreen 72 (FIG. 2) comprising a control section (at top) and a log section (at bottom). The control section includes a touchscreen slider control 90 running from 0 to 200 watts by which the rider can set, increase and/or decrease the power output parameter, an instantaneous power output reading (watts), and an indication of rotation direction (e.g., clockwise or counterclockwise). In addition, touchscreen "Connect" and "Disconnect" buttons are provided at top for initiating BLUETOOTH® connection/disconnection to/from the power meter 98. The bottom of the GUI comprises a log section, exemplified in this embodiment by a moving graph 92 of the average work output of the rider (5-second average in watts).

Referring back to FIG. 7, when the bicycle 2 is at rest and no torque is being applied to the pedal crank 10 the main actuator module 6 stays or returns to an initial low-gear ratio position. Any measurement below a 10 W minimum threshold is ignored so as not to shift gears in response to inadvertent turning of the crankset 10. However, once the measured torque raises above the threshold 10 W, then at step 250 the computer control system 8 software analyzes the data and computes the delta between the running 5-second average of work output of the rider and the rider-adjustable set point set by slider control 90. At step 260 the delta is subjected to a decision module which calculates the number of increments of clockwise or counterclockwise rotation to turn stepper motor 62 to minimize the delta. In a rudimentary embodiment this is a calibrated angular rotation based on the known maximum linear travel of the cables 142, 144 and the angular step increments needed to achieve that travel. In more extensive embodiments this is envisioned to be an optimization exercise which may be achieved using a generalized least squares approach, though other suitable optimization approach(es) may be used.

The linear travel of the cables 142, 144 generally depends on the throw of the shifting mechanism at the rear hub, and the degree of indexed rotation of the stepper motor 64 should be controlled such that the maximum linear travel of the cables 142, 144 affects a complete throw of the shifting mechanism in both directions. One skilled in the art will understand that the linear travel of the cables 142, 144 may be limited by software or hardware (e,g., stop-limit microswitches) to provide protection against over throw of the shifting mechanism at the rear hub.

At step 270 the number of increments of clockwise or counterclockwise rotation is the control signal received by the stepper motor driver 64 and decoded into the number of increments of clockwise or counterclockwise rotation, and at step 160 the stepper motor driver 64 implements the number of increments of clockwise or counterclockwise rotation, which in turn pull or retract the shift cables 142, 144 and CVT 14. The net result is a self-shifting bicycle 2 having a step less automatic transmission that takes the place of manual derailleurs, plus a graphical control system therefor that allows the rider to set their work output set-point as desired and easily increase or decrease it as needed. The system will maintain the output gear ratio accordingly relative to the load encountered as the cyclist rides.

It should now be apparent that the foregoing system allows the rider to set any desired power output parameter between 0-200 watts, and then observe their own running 5-second average of work output to ensure compliance with the set-point.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept.

For example, the present invention can be used in other pedal-drive vehicles such as tricycles, kayaks, etc. It is to be understood, therefore, that the invention may be practiced otherwise than as specifically set forth in the appended claims.

I claim:

1. A self-shifting bicycle, comprising:
a bicycle frame;
a handlebar mounted to said bicycle frame;
a wheel attached to said bicycle frame;
a transmission attached to said wheel;
a chain attached to said transmission;
a power sensor mounted on said bicycle and configured for outputting an indication of power output of a rider of said bicycle;
a computer control system mounted to said handlebar or frame and in communication with said power sensor, said computer control system including a touchscreen LCD display, and software comprising a series of computer-readable instructions for inputting and displaying a desired power level to/on said touchscreen display, for receiving said indication of power output, calculating there from an adjustment for maintaining a constant power output from the rider of said bicycle, and outputting a control signal calculated for adjustment of said transmission to maintain a constant power output from the rider despite changes in slope.

2. The self-shifting bicycle according to claim 1, further comprising a main actuator module in communication with said computer control system and in connection with said transmission for receiving said control signal from said computer control system and automatically varying said transmission to maintain said constant power output from the rider.

3. The self-shifting bicycle according to claim 1, wherein said transmission comprises a continuously-variable transmission.

4. The self-shifting bicycle according to claim 1, wherein said power sensor comprises a wireless transceiver for transmitting said indication of power output.

5. The self-shifting bicycle according to claim 1, wherein said main actuator module comprises a toothed pulley.

6. The self-shifting bicycle according to claim 5, wherein said main actuator module comprises a toothed belt attached to said pulley.

7. The self-shifting bicycle according to claim 5, wherein each end of said toothed pulley is attached to said transmission.

8. The self-shifting bicycle according to claim 1, wherein said software comprises a series of computer-readable instructions for displaying a control for adjusting said desired power level on said touchscreen display.

9. The self-shifting bicycle according to claim 1, wherein said software comprises a series of computer-readable instructions for displaying a measured power level on said touchscreen display.

10. The self-shifting bicycle according to claim 9, wherein said software comprises a series of computer-readable instructions for displaying a log of said measured power level over time on said touchscreen display.

11. The self-shifting bicycle according to claim 2, wherein said series of computer-readable instructions are configured to not output a control signal to said main actuator module when said indication of power output is below a minimum threshold.

12. A self-shifting bicycle, comprising:
a bicycle frame;
a handlebar mounted to said bicycle frame;
a wheel attached to said bicycle frame;
a transmission attached to said wheel;
a chain attached to said transmission;
a power sensor mounted on said bicycle and configured for outputting an indication of power output of a rider of said bicycle;
a computer control system mounted to said handlebar or frame and in communication with said power sensor for calculating a running average of said indication of power output from said rider, comparing said calculated running average to a desired power level inputted by a rider, and calculating there from an adjustment for maintaining a constant power output from the rider of said bicycle, and outputting a control signal calculated for adjustment of said transmission to maintain a constant power output from the rider despite changes in slope; and
a main actuator module in communication with said computer control system and in connection with said transmission for receiving said control signal from said computer control system and automatically varying said transmission to maintain said constant power output from the rider.

13. A transmission for a vehicle, comprising:
a front chain wheel;
a rear wheel mounted by a rear wheel hub that is connected by chain to said front chain wheel, said rear wheel hub comprising a mechanism for translating each rotation of said front chain wheel into a variable number of rotations of said rear wheel, and a control member for controlling said mechanism;
a power meter configured for outputting an indication of power applied to said front chain wheel; and
a computer control system comprising a processor and non-transitory computer-readable storage device storing a software module comprising a series of computer-readable instructions configured for carrying out the steps of,
inputting a desired power level;
inputting said indication of power applied to said front chain wheel,
comparing said indication of power applied to said front chain wheel to the inputted desired power level, and
outputting a control signal calculated for adjustment of said translation mechanism to maintain a constant power applied to said front chain wheel despite changes in slope.

14. The transmission for a bicycle according to claim 13, further comprising a main actuator module configured to receive said control signal and adjust the control member to selectively increase or decrease a ratio of said translation mechanism.

15. The transmission for a bicycle according to claim 14, wherein said rear wheel hub mechanism comprises a continuously-variable transmission.

16. The transmission for a bicycle according to claim 14, wherein said power meter comprises a wireless transceiver for transmitting measured torque applied to said front chain wheel.

17. The transmission for a bicycle according to claim 14, wherein said main actuator module comprises a toothed pulley.

18. The transmission for a bicycle according to claim 17, wherein said main actuator module comprises a toothed belt attached to said pulley.

19. The transmission for a bicycle according to claim 18, wherein each end of said toothed pulley is attached to said control member.

20. The transmission for a bicycle according to claim 14, wherein said computer control system comprises a touchscreen LCD display.

21. The transmission for a bicycle according to claim 14, wherein said software module comprises a series of computer-readable instructions for displaying said desired power level on said touchscreen display.

22. The transmission for a bicycle according to claim 21, wherein said software module comprises a series of computer-readable instructions for displaying a control for adjusting said desired power level on said touchscreen display.

23. The transmission for a bicycle according to claim 22, wherein said software module comprises a series of computer-readable instructions for displaying said measured power level on said touchscreen display.

24. The transmission for a bicycle according to claim 14, wherein said software module comprises a series of computer-readable instructions for displaying a log of said measured power level over time on said touchscreen display.

25. The transmission for a bicycle according to claim 14, further comprises a step of not outputting a control signal to the actuator of said main actuator module when said indication of power is below a minimum threshold.

26. The transmission for a bicycle according to claim 14, wherein said step of comparing said indication of power to the inputted desired power level comprises comparing a running average of said indication of power to said inputted desired power level.

* * * * *